(12) United States Patent
Lachajewski et al.

(10) Patent No.: US 10,506,107 B2
(45) Date of Patent: Dec. 10, 2019

(54) IN LINE COLOR MONITORING SYSTEM

(71) Applicant: QuadTech, Inc., Sussex, WI (US)

(72) Inventors: Steve J. Lachajewski, Pewaukee, WI (US); Stephen J. Daily, Brookfield, WI (US)

(73) Assignee: QuadTech, Inc., Sussex, WI (US)

( * ) Notice: Subject to any disclaimer, the term of this patent is extended or adjusted under 35 U.S.C. 154(b) by 0 days.

(21) Appl. No.: 15/137,473

(22) Filed: Apr. 25, 2016

(65) Prior Publication Data

US 2016/0344875 A1 Nov. 24, 2016

Related U.S. Application Data

(62) Division of application No. 12/958,104, filed on Dec. 1, 2010, now Pat. No. 9,325,860.

(51) Int. Cl.
| | | |
|---|---|---|
| H04N 1/04 | (2006.01) | |
| H04N 1/00 | (2006.01) | |
| B41F 33/00 | (2006.01) | |
| B41F 13/02 | (2006.01) | |

(52) U.S. Cl.
CPC ......... *H04N 1/00042* (2013.01); *B41F 13/02* (2013.01); *B41F 33/0036* (2013.01); *H04N 1/0005* (2013.01); *H04N 1/00015* (2013.01); *H04N 1/00023* (2013.01); *H04N 1/00031* (2013.01); *H04N 1/00045* (2013.01); *H04N 1/00058* (2013.01); *H04N 1/00087* (2013.01); *H04N 1/00251* (2013.01); *H04N 1/00602* (2013.01); *H04N 1/00615* (2013.01); *H04N 1/00673* (2013.01); *H04N 2201/0456* (2013.01)

(58) Field of Classification Search
CPC .......... H04N 1/00087; H04N 1/00082; H04N 1/00029; H04N 1/00031; H04N 1/00034; H04N 1/00037; H04N 1/00039; H04N 1/00045; H04N 1/00047; H04N 1/0005; H04N 1/00055; H04N 1/00058; H04N 1/00015; H04N 1/00251; H04N 1/00254; H04N 1/00257; H04N 1/00259; H04N 1/00615; H04N 1/0061; H04N 1/00612; H04N 1/603; H04N 1/6033; H04N 1/6036; H04N 1/6038; B41F 13/02; B41F 13/025; B41F 13/03; B41F 33/0036; B41F 33/0027
USPC ....... 358/500, 504–506, 509, 400, 406, 408, 358/486, 488, 498, 296
See application file for complete search history.

(56) References Cited

U.S. PATENT DOCUMENTS

| | | | | |
|---|---|---|---|---|
| 7,630,102 | B2 * | 12/2009 | Kurokawa | ............... H04N 1/12 358/461 |
| 2007/0070450 | A1 * | 3/2007 | Tanaka | ............... H04N 1/00909 358/498 |
| 2008/0137107 | A1 * | 6/2008 | Futami | .................. H04N 1/121 358/1.4 |

(Continued)

*Primary Examiner* — Dwayne D Bost
*Assistant Examiner* — Stephen M Brinich
(74) *Attorney, Agent, or Firm* — Boyle Fredrickson, S.C.

(57) ABSTRACT

A device and method for use with an image recording device. The device having a background target and a first surface including the background target recessed therein. The device further including a substrate stabilizer configured to move a substrate having an image printed therein in closer proximity to the background target and below the first surface when activated.

17 Claims, 12 Drawing Sheets

(56) References Cited

U.S. PATENT DOCUMENTS

2013/0242361 A1* 9/2013 Matsumoto .......... H04N 1/6044
358/504
2014/0218772 A1* 8/2014 Koshimizu ........ H04N 1/00013
358/461

* cited by examiner

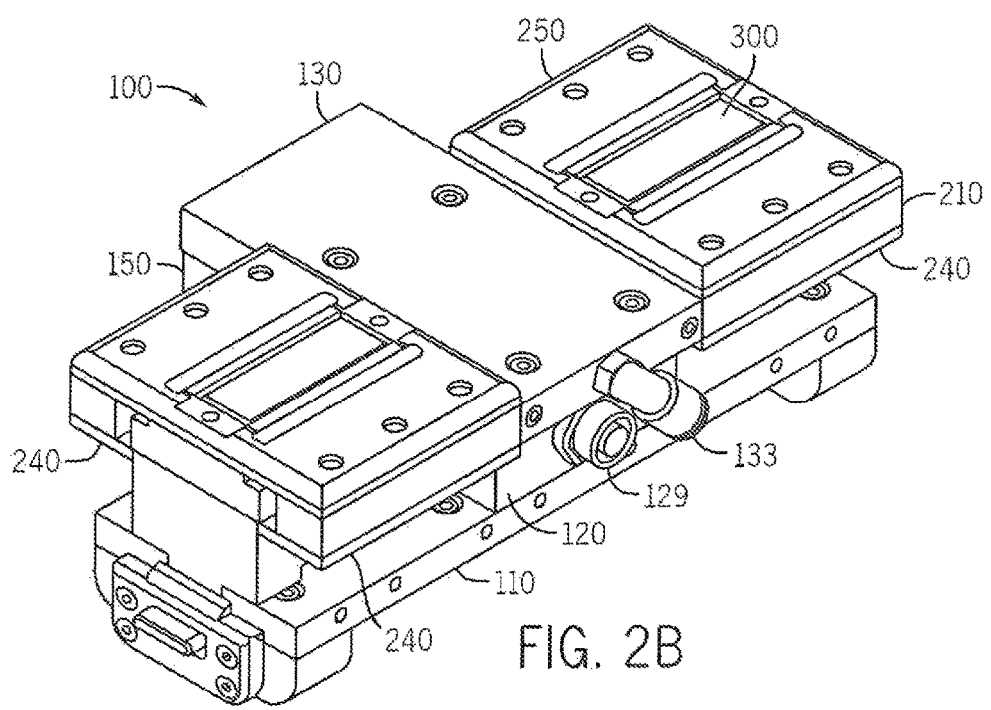

IN LINE COLOR MONITORING SYSTEM

CROSS REFERENCE TO RELATED APPLICATIONS

This application is a divisional and claims the benefit of U.S. patent application Ser. No. 12/958,104, filed Dec. 1, 2010, the entirety of which is hereby incorporated by reference.

FIELD

The present application generally relates to an apparatus, system and method for measuring spectral information on a printing press. More particularly, the present application relates to an apparatus, a system, and method for stabilization of a transitive substrate to facilitate measurement of color information on a printing press.

BACKGROUND

During the printing process, a selected image is repeatedly printed onto the surface of a substrate. A substrate is often provided in web form, a continuous roll of a material, or sheet form, separate sheets of substrate. The substrate is capable of receiving print while traveling through a printing press. To ensure the quality and accuracy of the printed image, various methods and devices have been developed fir monitoring the color and location of the ink that has been applied to the substrate. One such method includes placing a color bar, i.e. small quantity of individual ink components, on the substrate such that a color sensing camera can be positioned over the color bar. The camera can then scan the color quality and location accuracy of the individual ink patches represented in the color bar. If any color or location inaccuracies are detected in the color bar, a proportional inaccuracy may be present in the remainder of the printed image. Another method includes locating a color location without dedicated color marks or patches and instead using portions or regions of interest of the work being printed.

However, the current methods and devices for monitoring color accuracy during application of inks to a substrate are less accurate when the substrate is transparent and/or translucent, e.g. where the substrate is a thin plastic sheet. Color measurement is dependent on whether the substrate is transparent, translucent, or opaque. Transparent materials allow all or substantially all of the light rays to pass. Characteristic of this property is that transparent materials can be seen through; that is, they allow images to pass. The opposite property is opacity. Opaque materials do not allow any light rays to pass through because all of the light rays are being reflected or absorbed. Thus, objects cannot be seen through opaque materials. Translucent materials, on the other hand, allow some light rays to pass through the material while others are either absorbed or reflected. Because translucent materials allow light to pass through them diffusely, the image when seen through a translucent material is generally distorted. Transparent and translucent substrates are otherwise referred to herein as transitive substrates. The degree of transparency or translucency is measured by percent opacity, where a material is opaque at 100% opacity and transparent at 0% opacity. As opposed to printing on a paper substrate, a transitive substrate provides no discernable or consistent color background and therefore results in inaccurate color monitoring. Shadows are also created as a result of light being able to pass through the substrate. Previous attempts to remedy this shortcoming have included placing a background under the substrate. The background has been a ceramic tile having a predetermined color, usually white or black. The background may be positioned below the moving substrate to provide the necessary field for accurately monitoring the colored ink in the color bar. However, if the substrate is elevated above the ceramic tile during the scanning process, shadowing may result that will interfere with the accuracy of the image data received by the color sensing camera. Specifically, light used to illuminate the image for the camera may pass through the substrate at an angle creating shadows under other areas of the image and/or color bar. Accordingly, it is desirable to minimize the spacing between the substrate and background target.

However, it is often advisable to maintain some spacing during normal operation. Due to the abrasive nature of the moving substrate and in an effort to reduce the potential for ink transfer to the ceramic tile, contact between the substrate and the ceramic tile is desirably minimized.

Further inhibiting the application of current methods and devices for monitoring the application of colored inks to substrates, such as a transitive web, is the lack of surface stability within the transitive web. As the substrate is under tension during the printing process, small ripples or variations in the surface of the substrate may easily occur. Any inconsistency in the surface, height or tension of the substrate located in view of the color sensing camera may alter the accuracy of the image data received by the color sensing camera. Accordingly, it is desirable to avoid unnecessary application of force to the transitive substrate while simultaneously providing sufficient stability to the portion of the transitive substrate being scanned by the color sensing camera.

SUMMARY

Provided is a device for use with an image recording device. The device includes a background target, a first surface including the background target recessed therein. The device further includes a substrate stabilizer configured to move a substrate having an image printed therein in closer proximity to the background target and below the first surface when activated.

In one embodiment, the substrate contacts the background target during activation of the substrate stabilizer.

In another embodiment, the substrate stabilizer includes at least a first and second vacuum aperture, the first and second vacuum aperture positioned before and after a first and second rail in the direction for travel of the substrate.

In another embodiment, decreased air pressure temporarily stabilizes a portion of the substrate positioned above the background target and moves the substrate toward closer proximity to the background target.

In another embodiment, an image recording device is configured to obtain a color measurement of an image printed on the portion of the substrate in response to a detected location of an image on the substrate.

The present application also includes a method of substrate stabilization and monitoring the color printed on a transitive substrate. The method includes positioning a background target on a first side of an image printed on the transitive substrate, aligning an image recording device with the target, activating a substrate stabilizer located adjacent the target and activating the image recording device.

BRIEF DESCRIPTION OF THE DRAWINGS

Preferred exemplary embodiments are illustrated in the accompanying drawings in which like reference numerals represent like parts throughout.

In the drawings:

FIGS. 2A and 2B are an exploded and non-exploded view of the color monitoring substrate stabilizing apparatus according to an exemplary embodiment;

Figure 1:
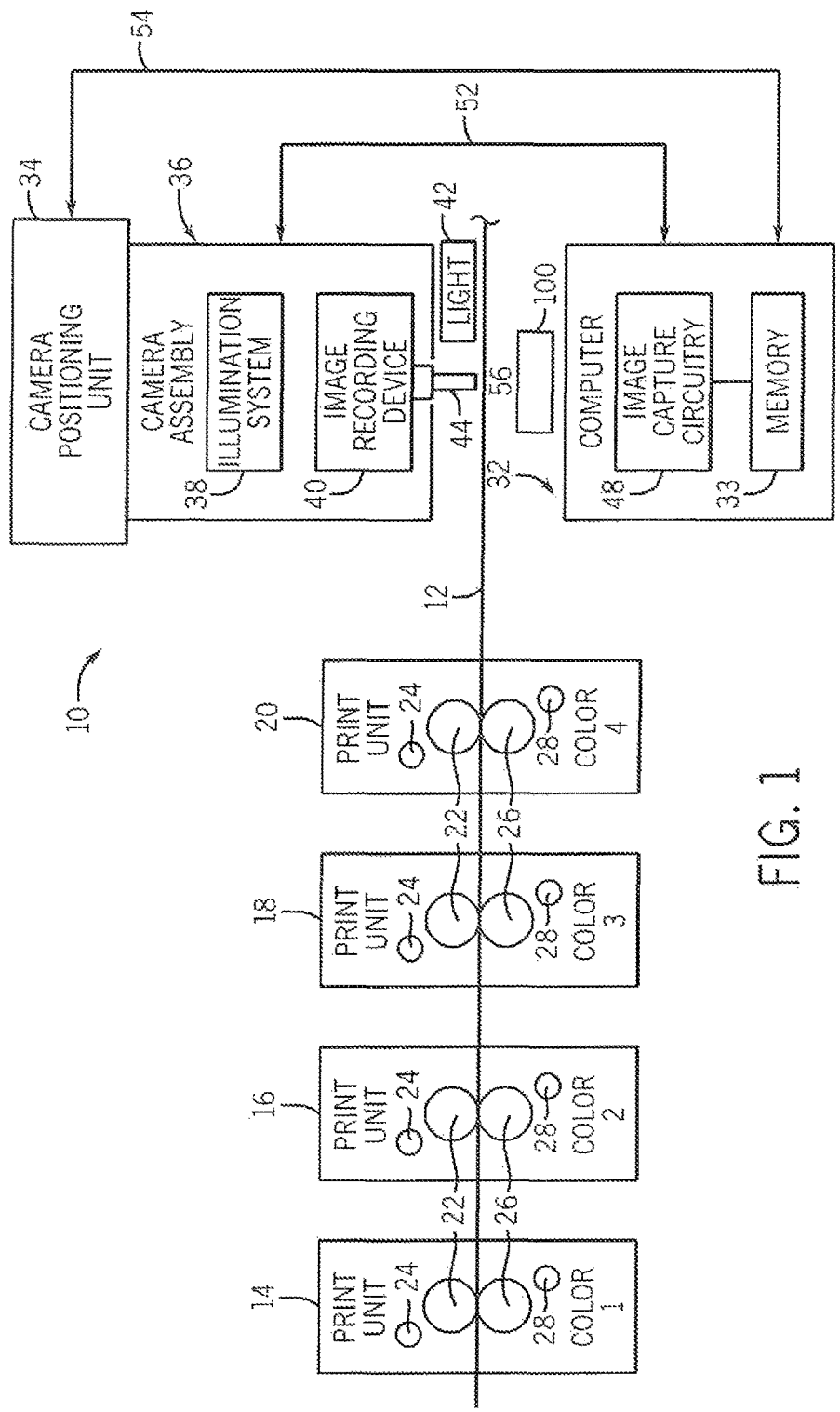
FIG. 1 is a block diagram of a printing system according to an exemplary embodiment.

Before one embodiment is described in detail, it is to be understood that the system and method is not limited in its application to the details of construction and the arrangement of components set forth in the following description or illustrated in the drawings. The system and method described herein is capable of other embodiments and of being practiced or of being carried out in various ways. Also, it is to be understood that the phraseology and terminology used herein is for the purpose of description and should not be regarded as limiting.

DETAILED DESCRIPTION

Referring to FIG. 1, one type of conventional printing system 10 for printing a multi-color image on a substrate, shown and described herein as web 12, is illustrated. In the illustrated embodiment, four printing units 14, 16, 18, and 20 each print one color of the image upon the web 12. This type of printing is commonly referred to as web offset printing. On a web offset press, each print unit 14, 16, 18, 20 includes an upper blanket cylinder 22, an upper printing plate cylinder blanket cylinder 26, and a lower printing plate cylinder 28. In the printing system 10, colors 1, 2, 3, and 4 on units 14, 16, 18, and 20 respectively, are black (K), cyan (C), magenta (M), and yellow (Y). However, it is understood that any colors of ink may be effectively analyzed by the present system. The location of the printing units 14, 16, 18, and 20 relative to each other is determined by the printer, and may vary.

In the illustrated embodiment, the printing press is a web offset press. It is contemplated, however, that the present system and method be applicable to other types of printing presses, such as rotogravure, flexographic, and sheet-fed presses. Further in the illustrated embodiment, the substrate is shown and described as web 12. It is further contemplated that the substrate may be any a form, such as printed sheet. It is further contemplated that the substrate may be transparent, partially transparent, translucent, etc. and/or may have one or more portions having these properties.

The present system and method may also be used for other applications, such as for use in the packaging industry, industrial printing, specialized printing, etc. The system and method may be used for printing on films such as lamination film, labels, decorative films, etc.

The system 10 includes an image processing apparatus 36 in optical communication with the web 12. The image processing apparatus 36 includes an illumination system 38 and an image recording device 40. Image recording device 40 may include one or more camera(s) or sensor(s) such as a CCD, CMOS, or other type of sensor configured to record and process optic information regarding web 12. The image recording device 40 could be used to image the transitive substrate and be configured to measure a colorimetric value and/or densitometric value from the transitive substrate, either alone or in combination with other processing devices. Such colorimetric and/or densitometric values may be measured from a portion of the substrate. The image recording device may further be used for quality color purposes, facilitating print quality control including identification of print issues such as pinholing, irregular dot shape, irregular dot area, halos, donut effects, mottling effects, etc. The portions of the substrate measured may include one or more colorants or inks placed therein, either in full-tone or half-tone forms. According to one embodiment, optic information may include spatial information measured with a first camera, spectral information captured with a second camera, high resolution information with a third camera, etc. The printing system 10 may also include a positioning unit 34, and a computer 32.

One or more color bars or color patches may be printed along an edge portion of web 12. Color bars typically include multiple patches of different colors (K, C, M, and Y in the present embodiment), intensities, and half-tone values (such as 25% patches, 50% patches, and 75% patches). The image processing apparatus 36 captures an image of one or more portions of these color bars and/or color patches to monitor the color quality of the web 12. However, it is understood that in some applications, the color bars may not be necessary as measurements can be taken from any region within the printed region. The information obtained from the color bars, color patches or from any other position on the substrate will be described in more detail below.

In general operation, the positioning unit 34 may selectively move the image processing apparatus to determined locations with respect to the substrate. In one embodiment, positioning unit 34 moves the image processing apparatus 36 to a first position on the web 12. A printed image is illuminated by the illumination system 38 and the image recording device 40 records an image signal which is representative of portion of the printed substrate within the field of view 56. The illumination system 38 can be synchronized with the movement of the web 12 such that the recorded image signal includes the desired target image on the substrate, such as a portion of the color bars, patches or other areas of the printed work.

The computer 32 may be of the conventional type such as including a microprocessor and PC architecture. The computer 32 can include random access memory 33 (semiconductor memory and/or disk drive storage) and image capture circuitry 48 which interfaces with the image processing apparatus 36. In other embodiments, the computer 32 may be a microprocessor housed within the image processing apparatus 36.

The computer 32 is connected to the positioning unit 34 by a communication link 54, and the computer 32 sends control signals to the positioning unit 34. The positioning unit 34 is mechanically coupled to the image processing apparatus 36 and moves the image processing apparatus 36 relative to the substrate, e.g., in a direction perpendicular to the substrate motion. Moving the image processing apparatus 36 across the web 12 allows selective image recording of portions of the printed image on the web 12. The image processing apparatus 36 records the printed image within the field of view 56 for various positions of the image processing apparatus 36 across the web 12. The web 12 is moving in the Y direction so that circumferential or Y-axis positioning by the positioning unit 34 may not be necessary if the image processing apparatus uses an encoder and/or strobe light in the illumination system 38 to effectively provide circumferential positioning relative to the moving web 12, as is further explained below.

It is also contemplated that a positioning unit not be utilized, if, for example, where one or more image processing apparatus are combined to obtain a field of view that covers all desired areas of the web 12, or if only one area of the web 12 is to be monitored.

Stabilization may be necessary to reduce the substrate motion toward and away from the image processing apparatus 36. This motion may be termed web flutter. Web flutter will cause the image to sometimes be out of focus and will cause the magnification of the image to change. Further, reduction of rippling or corrugations in the web may also be necessary. Any ripples in the web 12 can cause light and dark spots in the image obtained from the web 12. These light and dark spots do not usually affect the determination of the location of the color bar, color patch or whatever other area of the substrate is being imaged, but they can adversely affect the color measurements of t he image.

The image processing apparatus 36 and positioning unit 34 may be positioned on the press anywhere after the ink has been applied to the web 12. For example, they may be mounted between the last print unit and the dryer, directly after the dryer, on the chill rolls, or after the chill rolls. If optical density measurements are required in the absence of other inks, or if the measurement is immediately subsequent to printing, it may be advantageous to mount the image processing apparatus 36 and the positioning unit 34 between print units.

The illumination system 38 is coupled to the computer 32 by a communication link 52. The illumination system 33 includes a light source 42 (only one shown) and, optimally, a focusing mechanism 44. Control signals from the computer 32, corresponding to when a color bar is within the field of view 56, are sent via the signal bus 52 to indicate when the web 12 should be illuminated by the light source 42. The light source 42 in the illustrated embodiment is a xenon strobe; however other types of light sources can also be used. For example, for applications with slower substrate speed, halogen bulbs provide appropriate lighting. Lighting may include multiple light sources in multiple configurations, e.g., a circular configuration providing lighting inwardly from multiple light sources arranged in a circle, a linear configuration providing lighting in a single direction from a line of light sources, etc.

In one embodiment, pulsed xenon strobe lights with a pulse duration of approximately one microsecond are utilized. With a web speed of 3500 feet per minute and if it is desired to have the color bar (or sampled region) to move less than or equal to 0.0035" during the illumination period, a five microsecond illumination time is preferred to minimize the amount of movement of the printed image during the time the image recording device 40 is quantifying the amount of incoming light reflected from the web 12. By way of example, the light source 42 may include a strobe light assembly utilizing strobes FX-1163 with coordinated 1100 series trigger modules, available from Perkin-Elmer, however other types of light sources may be used including LEDs.

The illumination control signals from the computer 32 are produced, for example, by conventional means utilizing rotational position information generated from a sensor placed on one of the blanket cylinders (22 or 26), knowledge of the speed of the web 12, and knowledge of the distance between the image recording device 40 and the blanket cylinder (22 or 26).

The focusing mechanism 44 efficiently concentrates the light emitted from the light source 42 onto the image within the field of view 56. When the strobe light is flashed, the image recording device 40 records the image within the field of view 56, which contains portions of the color bars, color patches, or other regions of interest. In some embodiments, to reduce the effects of scattered light, the lighting could be modified such that only the color bar is illuminated when measuring the spectra. In this embodiment, a larger area of the printed substrate would be illuminated while searching for a color bar and once the color bar is found, the lighting would be reduced to illuminate only the color bar and the area just adjacent to the color bar.

Referring now to FIGS. 1-5, a substrate stabilizing apparatus 100 for use with color sensing for a transitive substrate may be positioned below the substrate within field of view 56. The stabilizing apparatus 100 can be any mechanism that enhances color measurement of a substrate by stabilizing at least a portion of the substrate for recording and processing of the printed image on the substrate by the image processing apparatus 36.

Substrate stabilizing apparatus 100 may be positioned opposite the image recording device 40 so as to be on an opposite side of the substrate from device 40. Substrate stabilizing apparatus 100 may further be positioned in any location relative to any portion of the substrate being targeted by device 40. Substrate stabilizing apparatus 100 may be positioned using any of a number of mechanisms including a sliding track (not shown) and/or any other mechanism used to move and hold a position of apparatus 100 relative to the substrate. Positioning may be performed manually and/or using computer controlled positioning.

Substrate stabilizing apparatus 100 is a device configured to operate in conjunction with image processing apparatus 36 to provide color measurement and/or control for a transitive substrate. Apparatus 100 is configured to use a background target 300, described below, to obtain accurate measurement of a color printed on the substrate. In order to obtain sufficiently discernable color measurement, apparatus 100 is configured to perform a web stabilizing function capable of moving the substrate in proximity to the background target while limiting the effects of web flutter, rippling, etc. However, to minimize abrasion and/or ink transfer based on contact between substrate and background target 300, the apparatus 100 may be configured to minimize or otherwise prevent the contact between the substrate and the apparatus 100. Accordingly, the apparatus 100 may be configured to move the substrate or a portion of the substrate below a first surface of the apparatus 100 that includes the background target 300 recessed therein when the substrate stabilizer is activated for brief periods.

Conventional color measurement technique requires that background target 300 be placed in contact with the substrate being measured to minimize error. For measurement of a moving substrate, however, it is advantageous to avoid contact between the substrate and the stationary background target 300. Avoiding contact allows the background target 300 to remain clean longer and reduces potential for damage to the substrate. Although it is desirable to balance avoiding contact with reducing the amount of any gap between the substrate and the background target 300, if the impact of a gap on measurement accuracy can be characterized, corrections can be made to reduce error. Additionally, by characterizing the impact, the substrate can be mechanically placed in optimum relation, e.g., as closely as possible and/or at a specified distance, to the background target 300 to minimize or otherwise allow compensation for the impact.

As will be disclosed in further detail herein, the apparatus 100 may include a primary control unit 102 and at least one subassembly 200 fixed to a mounting plate 110. The specific configuration of one embodiment of the apparatus 100 will be described in more detail below, although other type or designs of apparatus enabling the functions or advantages described herein may be used. The apparatus 100 is used in conjunction with at least one image recording device to monitor the application of colorants, such as ink, to a substrate during the printing process, as illustrated in FIG. 1.

Referring to FIGS. 2A, 2B, 3 and 7, the primary control unit 102 consists of a primary housing 120, a primary airflow manifold 130, and a valve assembly 150. The primary housing 120 is three sided, having bottom, front, and rear walls. A series of fastener apertures 126 allow the primary housing 120 to be attached to the mounting plate 110. A series of elevated mounting apertures 124 are configured to mount the primary circuit 125 within the primary housing 120. Primary circuit 125 controls a plurality of functions including selection of the air valve 150 and control over the air valve 150 function. Communication aperture 122 is positioned within the center of the front wall of the primary housing 120 and is configured to receive a communication link 129. The primary circuit 125 is coupled to the communication link 129, which in turn may be connected to an external computer or processing unit, such as computer 32 or a processing unit within the image processing apparatus 36. Located within the upper facing surfaces of the front and rear walls are series of fastener apertures 128, by which the primary airflow manifold 130 may be attached to the primary control unit 120. The rear wall of the primary control unit 120 also includes two passages 131, through which the valve assembly 150 may be mounted to the primary control unit 120 and coupled to the primary circuit 125.

Figure 4:
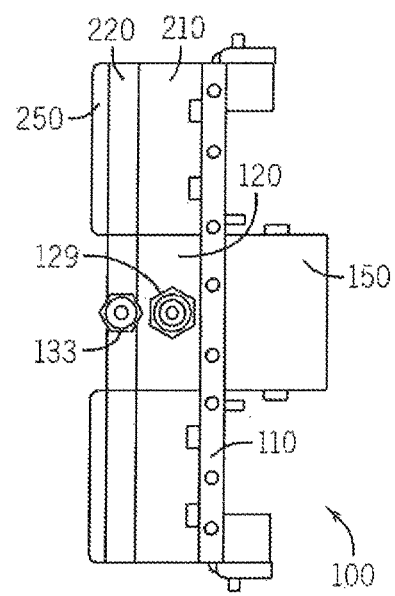
FIG. 4 is a front elevation view of the color monitoring substrate stabilizing apparatus in FIG. 2.
Figure 5:
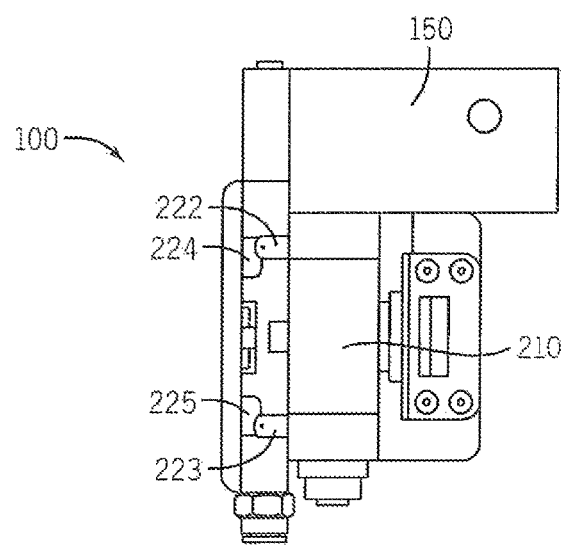
FIG. 5 is a side elevation view of the color monitoring substrate stabilizing apparatus in FIG. 2.
Figure 6:
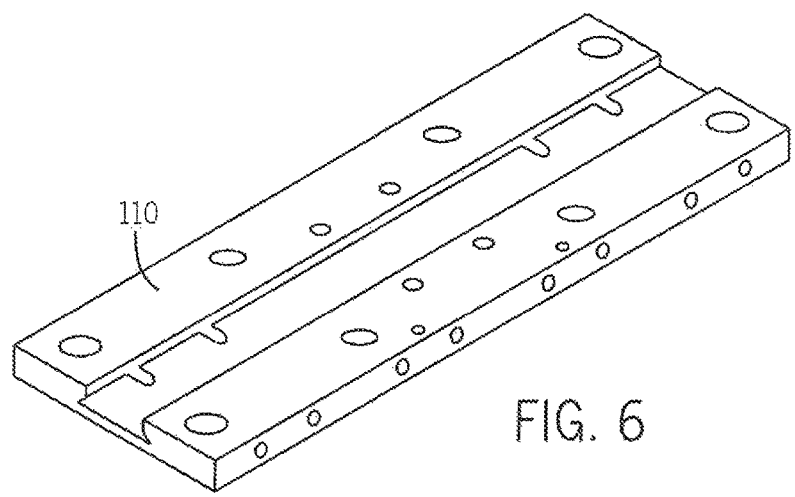
FIG. 6 is an isometric view of the mounting plate according to an exemplary embodiment.
Figure 7:
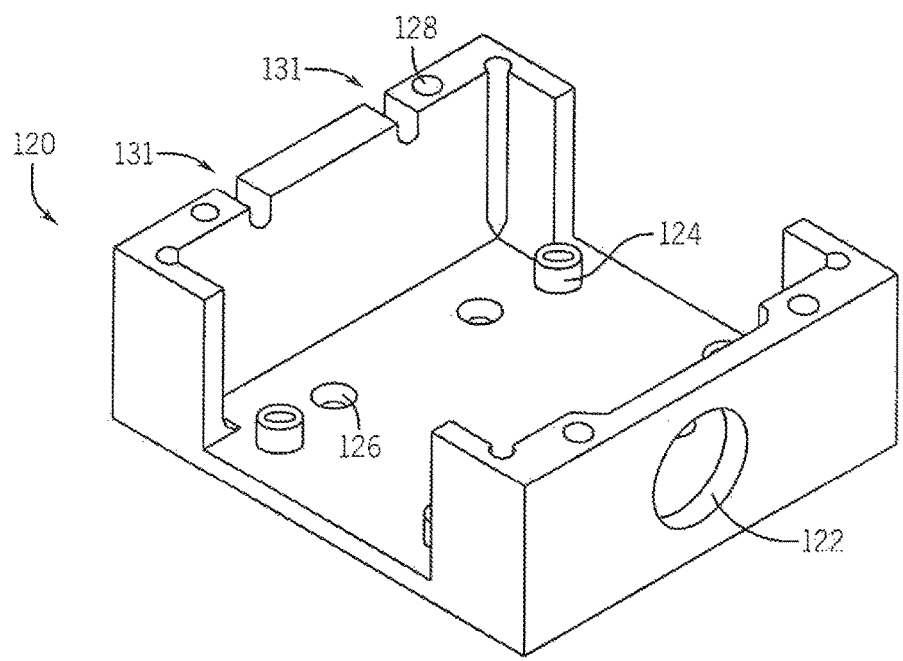
FIG. 7 is an isometric view of the primary housing according to an exemplary embodiment.
Figure 8:
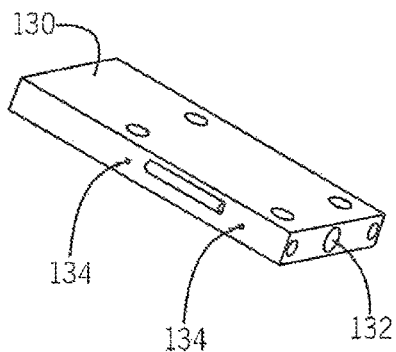
FIG. 8 is a top front isometric view of the primary airflow manifold according to an exemplary embodiment.
Figure 9:
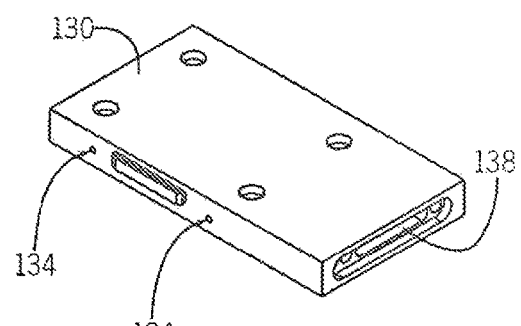
FIG. 9 is a bottom rear isometric view of the primary airflow manifold in FIG. 8.

FIGS. 8 and 9 illustrate the primary airflow manifold 130. Centrally located within the front wall of manifold 130 is an air supply aperture 132, in which an air supply nozzle 133, shown in FIG. 4, is received. The air supply nozzle 133 may be linked via hose or other conduit means to a source of pressurized air. Pressurized air received within through air supply aperture 132 is directed along an intake passage contained within the primary airflow manifold 30 until it reaches the valve assembly 150, also shown in FIG. 4. The valve assembly 150 is mounted primarily beneath the rear of the primary airflow manifold 130, and extends into the interior of the manifold 130 at opening 138. When the value assembly 150 receives a signal from the central circuit 125, the valve assembly opens, thereby allowing a small amount of pressurized air to flow into the first and second exit passages (not shown) located within the periphery of the primary airflow manifold 130. The pressurized air then exits first and second exit passages at apertures 134 located on either side of the primary airflow manifold 130. In one embodiment the apertures 134 are pinhole apertures with a diameter relative to the diameter of the first and second exit passages configured to result in an increased velocity of the air as it exits the primary airflow manifold 130. It is also contemplated that the apertures 134 may be angled to direct the flow of exiting air in a particular direction, for example slightly downward. Closures 136, located in the front wall of the primary airflow manifold 130, direct the air within the first and second exit passages through the apertures 134.

As illustrated in FIGS. 2B-5, one or more subassemblies 200 may be mounted on either side of the primary control unit 102. In an exemplary embodiment, subassemblies 200 include a secondary housing 210, a secondary airflow manifold 220, a face plate 250, and a background target 300. Subassemblies 200 are configured to include a background target 300 and to perform the substrate stabilizer function over a portion of the substrate directly above the background target 300 as described in detail below.

Figure 2A:
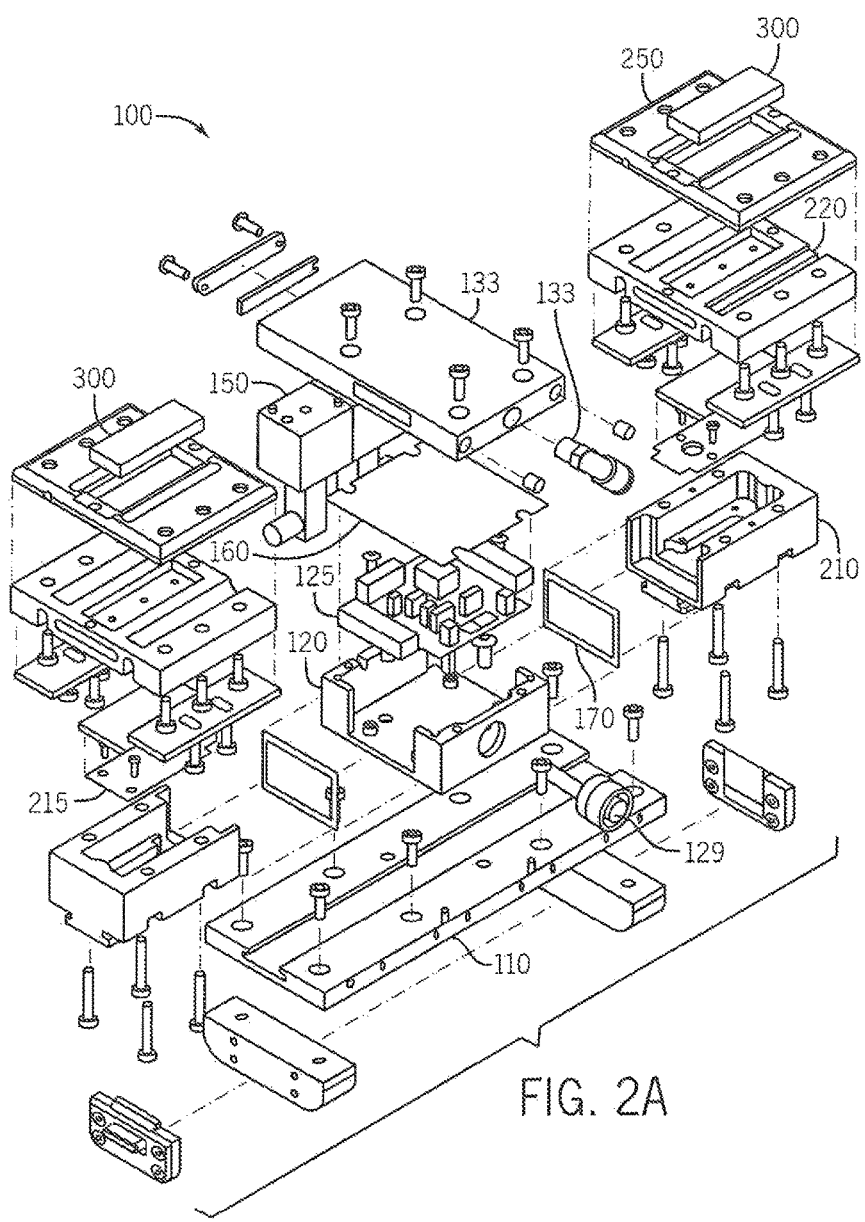
Figure 3:
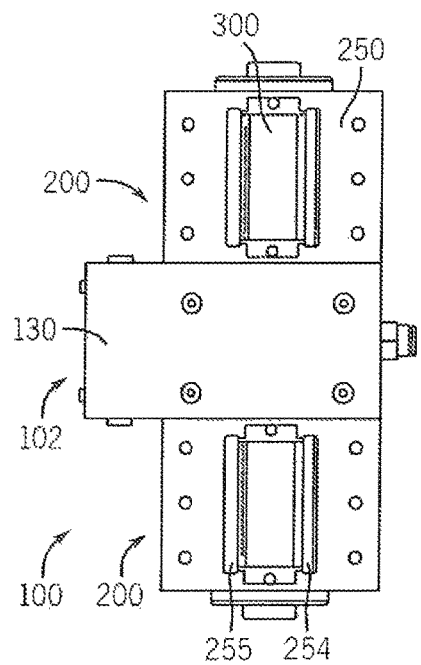
FIG. 3 is a top plan view of the color monitoring substrate stabilizing apparatus in FIG. 2.
Figure 10:
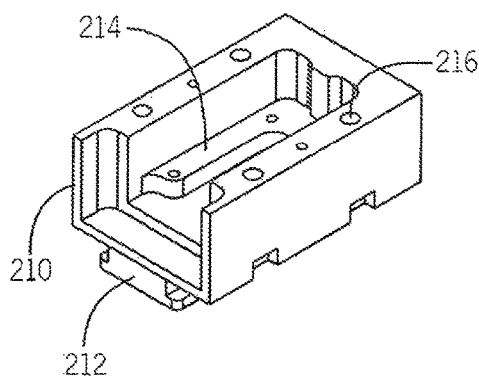
FIG. 10 is a top front isometric view of the secondary housing according to an exemplary embodiment.
Figure 11:
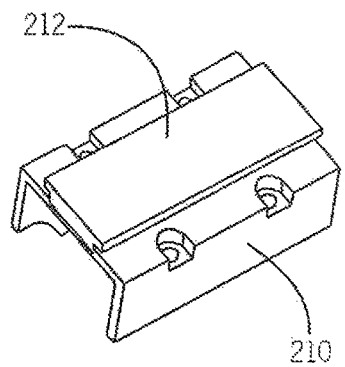
FIG. 11 is a top rear isometric view of the secondary housing in FIG. 10.

Referring to FIGS. 2A, 10 and 11, the secondary housing unit 210 include: four sides, including a bottom, rear and two side walls. A fastening rail 212 allow the secondary housing 210 to be attached to the mounting plate 110. A series of elevated mounting rails 214 are configured to mount a secondary circuit 215 within the secondary housing 210. When mounted within the secondary housing 210, an extended portion of the secondary circuit 215 may extend through the open front of the secondary housing 210. This configuration allows the extended portion of the secondary circuit 215 to pass through an open side of the primary housing 120, and thereby couple with the primary circuit 125 when the entire apparatus 100 is fixed to the mounting plate 110. By means of coupling the secondary circuit 215 to the primary circuit 125, information contained on the secondary circuit 215 may be transmitted to the external computer via the communications link 129. Such information may include spectral measurement details regarding the color of the background target 300 contained within subassembly 200. Located within the upper facing surfaces of the rear and side walls are a series of fastener apertures 216, by which the secondary airflow manifold 220 may be attached to the secondary housing 210.

Figure 12A:
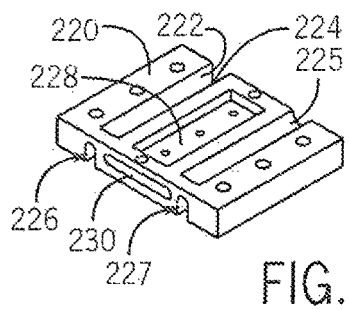
FIG. 12A is a top front isometric view of the secondary airflow manifold according to an exemplary embodiment.
Figure 12B:
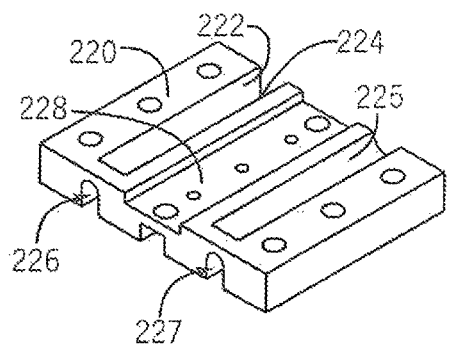
FIG. 12B is a top front isometric view of an alternative embodiment of the secondary airflow manifold in FIG. 12B.

Referring now to FIGS. 12A-113B, are two illustrative embodiments of the secondary airflow manifold 220 are shown. The secondary airflow manifold 220 comprises a first channel 222 and a second channel 223 through which air received from aperture 134 flows from the front side of the manifold 220 to the rear side. In fluid communication with the first and second channels 222, 223 are first and second offset channel extensions 224 and 225, respectively. The offset channel extensions 224, 225 are configured to direct decreased or negative air pressure, i.e. a vacuum, therein, in response to the movement of air that flows through the first and second channels 222, 223 respectively. Air may enter the first and second channel 222, 223 through the first and second channel entrances 226, 227 disposed within the front side of the secondary airflow manifold 220.

Figure 13A:
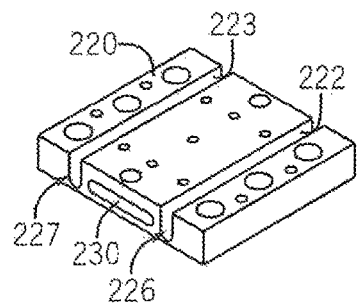
FIG. 13A is a bottom front isometric view of the secondary airflow manifold in FIG. 12A.
Figure 13B:
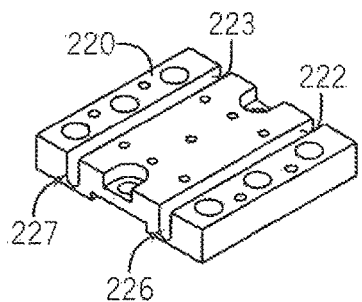
FIG. 13B is a bottom front isometric view of the alternative embodiment of the secondary airflow manifold in FIG. 12B.

In one embodiment, illustrated in FIGS. 12A and 13A, the front side of the secondary airflow manifold 220 further contains a stabilization recess 230. When the apparatus 100 is fixed to mounting plate 110, a portion of the primary control unit 102 is received within the stabilization recess 230. Accordingly, the interaction between the primary control unit 102 and the stabilization recess 230 will provide additional support to the secondary airflow manifold 220 and decrease vibrations or movement experienced during operation of the apparatus 100.

It is also contemplated that the bottom surfaces of the first and second channels 222, 223 are formed by retractable components. In one illustrative embodiment, the retractable components consist of plates 240, shown in FIG. 2B, movable between a closed position and an open position. When in the closed position, the plates form the fully closed bottom surfaces of the first and second channels 222, 223, thereby directing all air that enters through the first and second channel entrances 226, 227 through the entire length of the first and second channel 222, 223. Alternatively, when the plates are in a fully opened position, the first and second channels 222, 223, lack any bottom surface and thereby allow air that enters through the first and second channel entrances 226, 227
to vent from, i.e. exit, the first and second channel 222, 223 prior to reaching the rear side of the secondary airflow manifold 220, such that the vacuum applied to the top surface is decreased. It is also contemplated that the plates may be placed in any position between fully opened and fully closed, thereby directly regulating the amount of airflow which vents from the first and second channel 222, 223 prior to reaching the rear side of the secondary airflow manifold 220.

In operation, the movement of airflow through the first and second channel 222, 223 results in the decrease in air pressure, i.e. negative or vacuum pressure formation, along the first and second offset channel extensions 224, 225 respectively. In accordance with Bernoulli's Principle, the increase in the speed of airflow through the channel 222, 223 will directly result in an increase negative or vacuum pressure formed along the first and second offset channel extensions 224, 225 respectively.

Although movement of the substrate in the exemplary embodiment shown is achieved using channel extensions 224 and 225 using Bernoulli's principle, it should be understood that movement and/or stabilization of the substrate may be achieved using one or more other devices and/or methods. For example, the substrate may be stabilized using a positive air flow, for example downwardly directed onto the substrate, using one or more rollers in transitory contact with substrate, etc.

Resultantly, when the retractable plates are in a fully closed position, the air traveling through the channels 222, 223 is not inhibited, and therefore maintains a high speed of travel resulting in an increased negative or vacuum pressure formed along the offset channel extensions 224, 225. Alternatively, when the retractable plates are in a fully open position, the air traveling through the channels 222, 223 is allowed to vent along the length of the channel thereby decreasing the force of the air remaining within the channels 222, 223. This decrease is air force results in a decreased speed of air travel in the channels 222, 223, which in turn results in a decreased force of negative or vacuum pressure formed along the offset channel extensions 224, 225. Accordingly, the position of the retractable plates may be moved between fully closed and fully open to either increase or decrease the degree of vacuum pressure formed in the secondary airflow manifold 220. In one embodiment, the retractable plates may be positioned manually. In an alternative embodiment the retractable plates may be positions by means of an electrical controlling device.

In application, the force of the vacuum pressure required in a given application may be configured based on the physical properties of the transitive substrate as it is presented over the stabilizer 100, i.e. width, thickness, tension, elasticity, etc. Accordingly, the position of the retractable plates will be configured based on the force of vacuum pressure required by the given transitive substrate.

Further, the force of the vacuum pressure may also influence the formation of ripples or variations along the surface of the transitive substrate during the substrate stabilization and color monitoring process. Specifically, any inconsistency in the height or tension of the substrate located directly above the background target 300 may alter the accuracy of the image data received by the color sensing camera. Any surface variations along the substrate may also impair the accuracy with which the printed image is applied to the substrate during the printing process. Accordingly, the force of the vacuum pressure produced in assembly 100 may be regulated by the location of the retractable plates such that during activation of the valve assembly 150, adequate vacuum pressure is generated as to stabilize the portion of the substrate located above the background target 300 without inducing potentially harmful tension throughout the transitive substrate.

Referring again to FIGS. 5, 8, 12A, 12B, 13A and 13B, in operation, the first and second channel entrances 226, 227 located in front side of the secondary airflow manifold 220 are positioned adjacent the apertures 134 located in the sides of the primary airflow manifold 130. As such, activation of the valve assembly 150 results in release of a high pressure air pulse from the apertures 134, through the channel entrances 226, 227 and into the channels 222, 223. The timing and duration of the air pulse may be computer controlled using the computer 32, described above with reference to FIG. 1. The movement of air through the channels 222, 223 resultantly induces the formation of a vacuum in the offset channel extensions 224, 225. The offset channel extensions 224, 225 are positioned lateral to the channels 222, 223 respectively as to prevent any air released from the apertures 134 from traveling in a linear vector into the offset channel extensions 224, 225. Such an orientation thereby decreases the potential airflow counteracting the vacuum pressure formed in the offset channel extensions 224, 225, as well as maintains a greater volume of air within the channels 222, 223 thereby resulting in a high velocity of air travel through the channels 222, 223 and a greater vacuum pressure formed in the offset channel extensions 224, 225. Additionally, air released from the apertures 134 may also be directed away from traveling in a linear vector into the offset channel extensions 224, 225 by means of angling the apertures 134 at a slight downward angle, i.e. directed away from the offset channel extensions 224, 225.

Figure 14A:
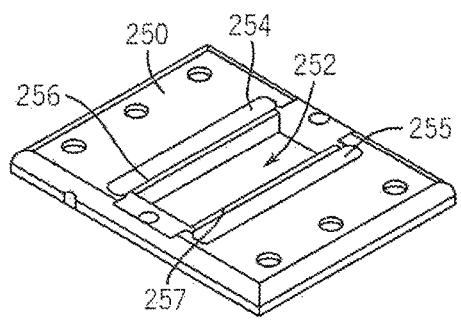
FIG. 14A is a top front isometric view of the face plate according to an exemplary embodiment.
Figure 14B:
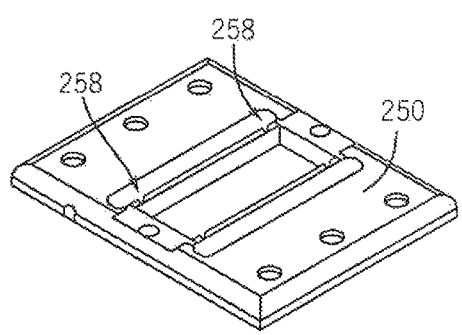
FIG. 14B is a top front isometric view of an alternative embodiment of the face plate in FIG. 14A.
Figure 14C:
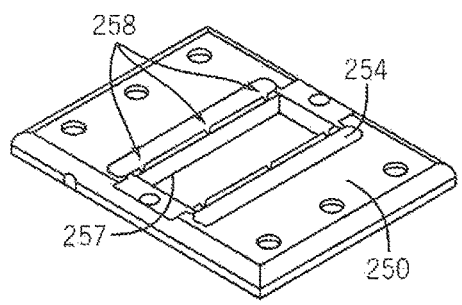
FIG. 14C is a top front isometric view of an alternative embodiment of the face plate in FIG. 14A.
Figure 15:
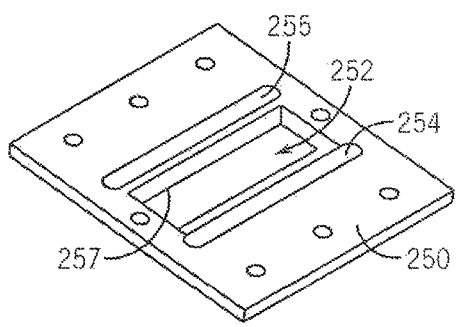
FIG. 15 is a bottom front isometric view of the face plate in FIG. 14A.

The vacuum formed in secondary airflow manifold 220 is directed to the surface of the subassembly 200 through the face plate 250. Illustrated in FIGS. 14A-15, the face plate 250 of the present system and method includes a first and second vacuum aperture 254, 255 in fluid communication with the first and second offset channel extensions 224, 225 respectively. Bordered on either side by the vacuum apertures 254, 255 is a background target 300, shown in FIG. 2A. The background target 300 is contained within a recess 252 centrally located in the face plate 250. Between the recess 252 and the first and second vacuum apertures 254, 255 are the first and second elevated rails 256 and 257, respectively. In one embodiment, as illustrated in FIG. 14A, the rails 256, 257 may be continuously formed such that no air will flow between the apertures 254, 255 and the recess 252, thereby confirming vacuum pressure to the first and second vacuum apertures 254, 255. However, it is also contemplated that the rails 256, 257 may include one or more furrows 258 allowing the vacuum pressure to flow to recess 252 and the surface of the background target 300, similarly creating a vacuum within recess 252. FIG. 14B illustrates one alternative embodiment in which the rails 256, 257 include furrows 258 positioned near the edges of the rails 256, 257, which are desirable to create a wliform vacuum within recess 252. FIG. 14C illustrates a second alternative embodiment in which each rail 256, 257 includes three equally spaced furrows 258.

In one embodiment of the present system and method, face plate 250 may be formed of an anti-static material with a low coefficient of friction, e.g., less than 0.15 and preferably less than 013. Examples include polyethylene, a material which meets FDA and USDA food safety guidelines for food storage containers, such as TIVAR® CleanStat™, and other similar materials.

Figure 16:
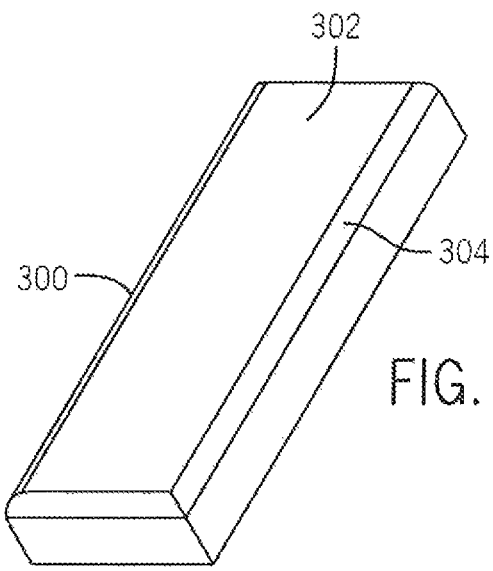
FIG. 16 is an isometric view of the tile according to an exemplary embodiment.
Figure 17:
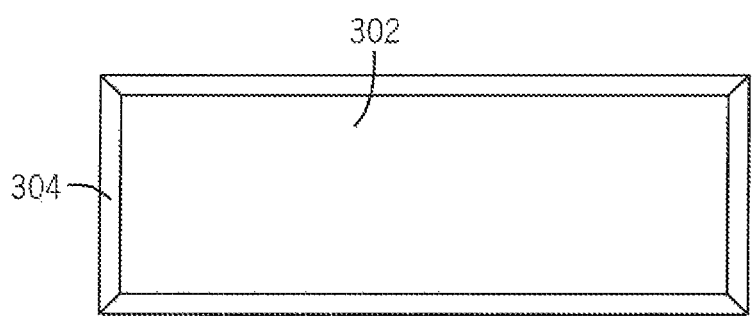
FIG. 17 is a top plan of the tile in FIG. 16.
Figure 18:
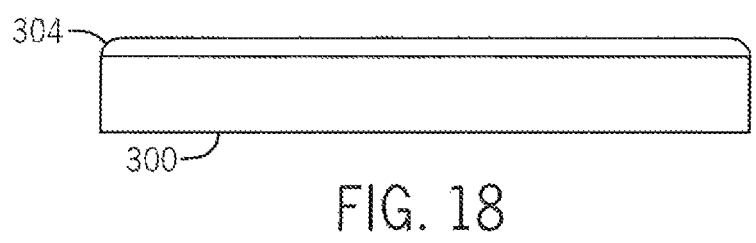
FIG. 18 is a side elevation view of the tile in FIG. 16.

One embodiment of the background target 300 is illustrated in FIGS. 16-18. The background target 300 has a flat top surface 302 and rounded upper edges 304. The shape of the background target 300 is intended to reduce friction when the background target 300 is contacted by the transitive substrate. In one embodiment, the background target 300 may be a ceramic tile, however alternative materials are considered within the scope of this system and method. As previously described above, the background target 300 has a predetermined color. In one embodiment the apparatus 100 comprises a first and second subassembly 200, wherein the first subassembly 200 comprises a white background target 300 and the second subassembly 200 comprises a black background target 300. The two different background targets may be independently positioned under the image recording device 40 dependent on the desired measurements and tests being performed. In operation, the black background target 300 is used to test opacity, detect coverage and pinholing, detect defects, etc., while the white background target 300 is used for defect detection as described above and to test opacity and color accuracy. In one embodiment, the substrate stabilization of the first and second subassembly 200 occurs simultaneously, such that a first and second camera are activated concurrently to receive imaging data from the substrate located above the black and white background targets 300 simultaneously. The first and second cameras may be either configured to receive spectral measurements, spatial measurements, or any combination thereof. The image capture circuitry 48 may be configured to compare stored values for a background target 300 to a periodic measurement to confirm tile spectral integrity.

Figure 19:
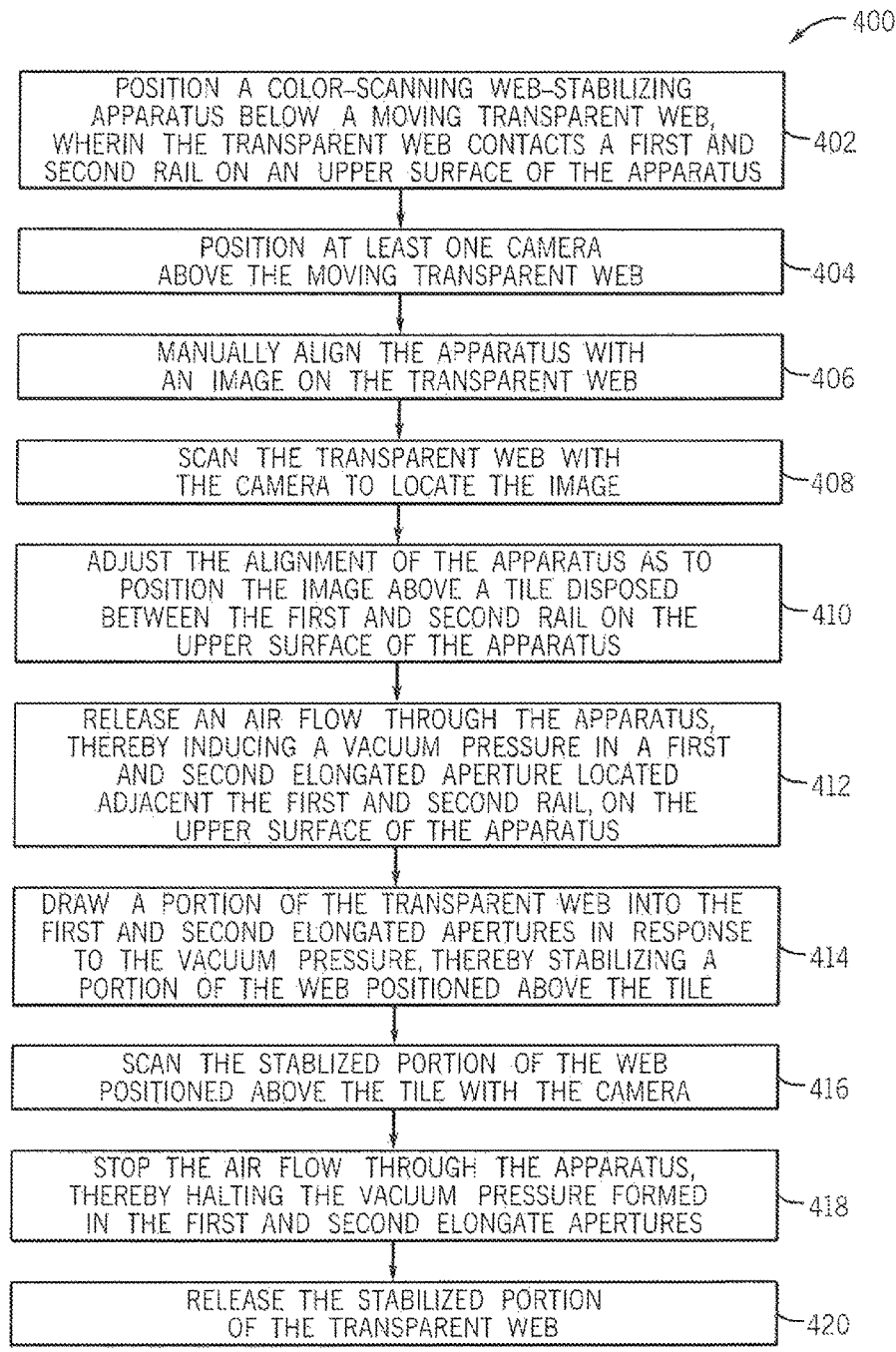
FIG. 19 is a flow chart illustrating the method of substrate stabilized color monitoring according to an exemplary embodiment.

During operation, as illustrated in step 402 of flow chart 400, illustrated in FIG. 19, the apparatus 100 may be located beneath the moving transitive substrate, wherein the substrate contacts a first and second rail 256, 257 on an upper surface of the apparatus 100. In step 404, at least one camera is then positioned above the moving transitive substrate. In step 406, the apparatus 100 is aligned with an image printed on the transitive substrate. This step may be computer-implemented and/or manually implemented. In step 408, the transitive substrate is then scanned with the camera to identify the location of the printed image. In step 410, adjustment to the alignment of the apparatus 100 is made to position the image above a background target, or tile, 300 disposed between the first and second rail 256, 257 on the upper surface of the apparatus 100. In step 412, an air flow is then released through the apparatus 100, thereby inducing a vacuum pressure in the first and second elongated apertures 254, 255 located adjacent to the first and second rails 256, 257 on the upper surface of the apparatus 100. As illustrated in step 414, in response to the vacuum pressure, a portion of the transitive substrate is drawn into the first and second elongated apertures 254, 255, thereby stabilizing a portion of the substrate positioned about the tile 300. In step 416, the camera is then activated to scan the stabilized portion of the substrate positioned above the tile 300. In step 418, after the camera has obtained an image, the air flow through the apparatus 100 is stopped, thereby halting the vacuum pressure formed in the first and second apertures 254, 255. In final step 420, resultantly, the stabilized portion of transitive substrate is released.

In alternative embodiment, the apparatus 100 is located beneath the substrate such the underside of the substrate contacts the elevated rails 256, 257 of the subassemblies 200. In such a configuration, the substrate does not contact the background target 300, which is recessed within the face plate 250 below the elevation of the elevated rails 256, 257. Upon activation of the valve assembly 150, a pulse of pressurized air is released from the apertures 134, and travels along the channels 222, 223. The velocity of the airflow traveling through the channels 222, 223 results in the formation of a vacuum pressure along the offset channel extensions 224, 225 and vacuum apertures 254, 255 respectively. In response to the vacuum pressure, a portion of the substrate located above the vacuum apertures 254, 255 is pulled slightly into the vacuum apertures 254,255, below the upper surface of the face plate 250. The resulting tension in the portion the substrate above the background target 300 temporarily three the substrate in close proximity to the background target 300 and stabilizes the portion of the substrate located between the first and second vacuum apertures 254, 255. In an alternative embodiment, the vacuum pressure transmitted via furrows 258 further draws the substrate into contact with the background target 300. At the point when the substrate is stabilized and contacting the background target 300, the camera assembly 36 captures an image that has been printed onto the substrate, such as a color bar.

In order for the camera to obtain an accurate image, the present system and method illustrates a means for reducing optical refraction through the transitive substrate. Optical refraction is a phenomenon in which the direction of a light wave is altered as is travels through various mediums at different speeds. Accordingly, the potential for optical refraction is increased the greater distance between the substrate and the background target 300 as this orientation allows light to travel out of the transitive substrate, through air before the light strikes the background target 300, back to the camera through the substrate. By creating a contact between the transitive substrate and the background target 300, via substrate stabilization, apparatus 100 reduced the ability of light to exit the underside of the substrate. Therefore, by reducing the distance between the substrate and the background target 300, the apparatus 100 significantly decreases the potential for optical refraction resulting in the camera assembly 36 accurately sensing the image.

Figure 20A:
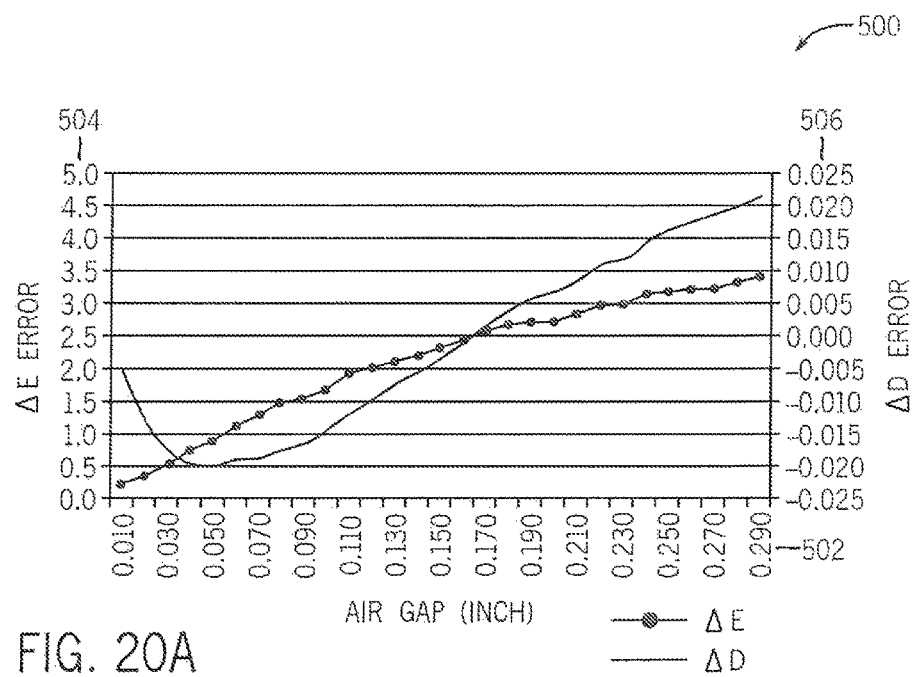
FIGS. 20A-C are charts illustrating the impact of an air gap between the background target and a transitive substrate on measurement accuracy.
Figure 20B:
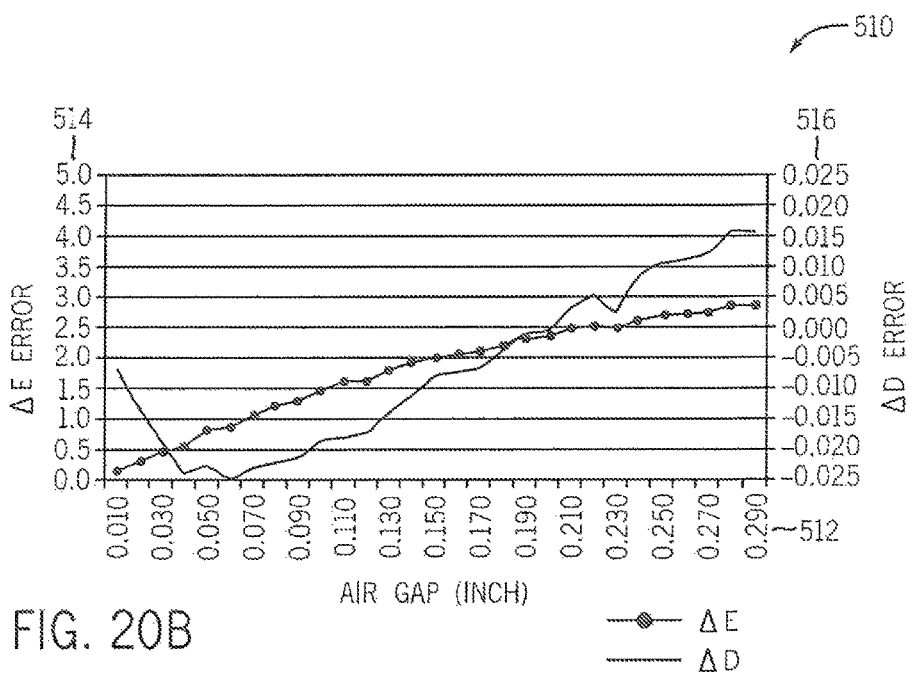
Figure 20C:
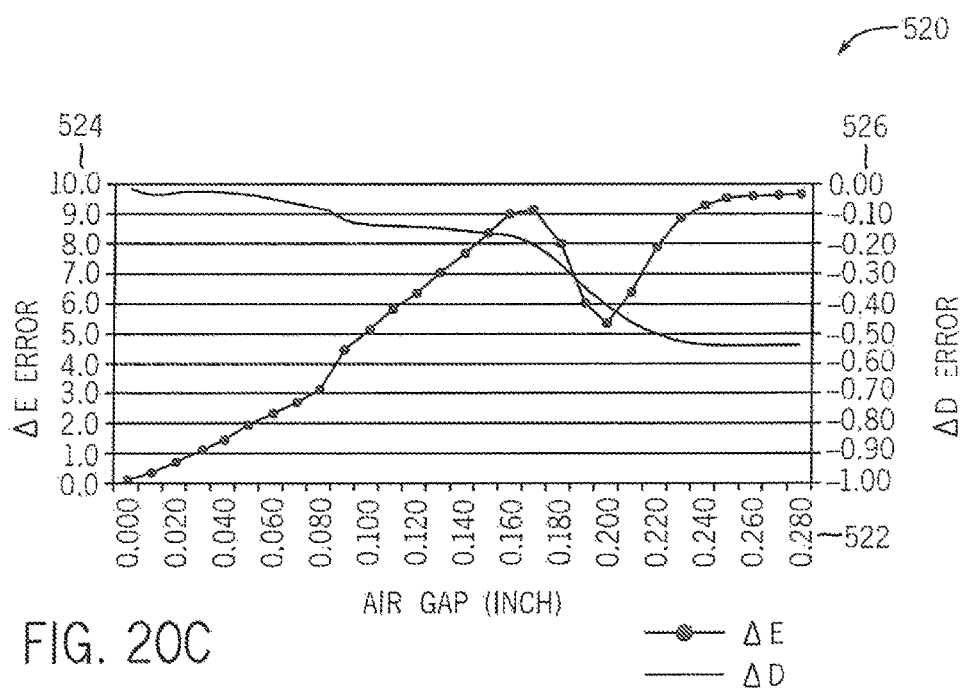

Referring now to FIGS. 20A-C, charts 500, 510 and 520 illustrate the impact of an air gap between the background target 300 and a transitive substrate on measurement accuracy, according to an exemplary embodiment. Charts 500-520 illustrate measurement values for varying distances between a substrate and the background target 300. The background target 300 used for the exemplary embodiment was a white ceramic tile.

Three samples were measured by the device: a solid patch of cyan on a white substrate (referred to herein as the translucent substrate), shown in chart 500, a solid patch of magenta on the translucent substrate, shown in chart 510, and a solid patch of magenta on a clear substrate (referred to herein as the transparent substrate), shown as chart 520. The opacity of the translucent substrate was 81.6%, and the opacity of the transparent substrate was 0.5%, as measured by a handheld color measurement device sold under the name X-Rite model 939 spectrodensitometer. The gap sizes illustrated in charts 500-520, along x-axes 502, 512, and 522, respectively, range from zero (in zero contact) to 0.290 inches, and were measured in 0.010 inch increments. At each gap position, the device averaged twenty individual measurements in order to reduce measurement noise. The measurement from each gap was analyzed to determine how much it differed from the zero gap measurement. The color errors ($\Delta E$) are shown along first y-axes 504, 514 and 524, respectively. The density errors ($\Delta D$) are shown along second y-axes 506, 516 and 526, respectively.

Generally, it may be preferable to have a measurement within about 5 $\Delta E$ of the target color value and/or about 0.15 $\Delta D$ of the target density value, and more preferably to have a measurement within about 3 $\Delta E$ of the target color value and/or about 0.10 $\Delta D$) of the target density value, and yet even more preferably to have a measurement within about 1.5 $\Delta E$ of the target color value and/or about 0.05 $\Delta D$ of the target density value. Such measurement values may be changed or desired based on various factors including, for example, the level of accuracy desired for different types of production quality. Table 100 further illustrates exemplary gap measurements and resultant levels of accuracy.

TABLE 100

| | | Gap (in inches) between substrate and backing | | |
|---|---|---|---|---|
| | | Magenta on translucent substrate | Cyan on translucent substrate | Cyan on transparent substrate |
| Most preferable | Color: 1.5 $\Delta E$ | 0.080 | 0.100 | 0.050 |
| | Density: 0.05 $\Delta D$ | >0.290 | >0.290 | 0.070 |
| More preferable | Color: 3 $\Delta E$ | 0.230 | >0.290 | 0.080 |
| | Density: 0.10 $\Delta D$ | >0.290 | >0.290 | 0.090 |
| Preferable | Color: 5 $\Delta E$ | >0.290 | >0.290 | 0.100 |
| | Density: 0.15 $\Delta D$ | >0.290 | >0.290 | 0.140 |

As charts 500-520 illustrate, for some range of small gaps, the measurement errors would be somewhat constant. This is because any additional light scattering due to small air gaps was believed to have minimal impact on measurement accuracy. This contrasts with the expectation that the error curves for $\Delta E$ would be somewhat flat with very small increases in an air gap, and then increase quickly once a threshold was reached. This also contrasts with the expectation that, at some larger air gap size, light scattering between the lower surface of the substrate and the surface of the backing material becomes significant, and the measurement accuracy would drop off rapidly such that a small gap would respond the same as a 0 gap, but the "approximation of zero" would fall apart with larger gaps. The impact of the differences in the index of refraction of air versus the transitive substrate is substantial, and any gap works as an additional "light diffuser." Accordingly, as the air gap is changed, even slightly, the corresponding measurement error also changes.

As charts 500-520 and Table 100 illustrate, accuracy, particularly density accuracy, is fairly tolerant of air gaps when measuring ink on the translucent substrate without mathematical measurement correction. As shown in charts 500 and 510, the gap between the translucent substrate and the background target 300 may be in the range of about 0.00 inches to at least about 0.290 inches, while remaining in an acceptable $\Delta D$ range. However, as shown in chart 520, accuracy degrades more quickly with an increase in gap size when measuring ink on the transparent substrate. The gap between the transparent substrate and the backing material can be preferably in the range of about 0.00 inches to about 0.150 inches, and more preferably in the range of about 0.00 inches to about 0.10 inches, and most preferably in the range of about 0.00 inches to about 0.08 inches.

When taking into account the desired $\Delta E$ tolerance for color measurement, the gap between the translucent substrate and the backing material can be preferably in the range of about 0.00 inches to at least about 0.290 inches, and more preferably in the range of about 0.00 inches and about 0.250 inches, and even more preferably in the range of about 0.00 inches and about 0.1 inch. For the transparent substrate, or to set up, use or otherwise configure the device for use with all transitive substrates, the gap between the transitive substrate and the backing material can be preferably in the range of about 0.00 inches to about 0.1 inches, and more preferably in the range of about 0.00 inches and about 0.08 inches, and even more preferably in the range of about 0.00 inches and about 0.05 inches.

The chart 520 in FIG. 20C illustrates the impact of shadows projected onto the background target 300 can have on measurement accuracy using a 100% cyan patch that has a 100% black patch adjacent to one side and a 100% magenta patch adjacent to the other. Using 45 degree orientation of the illumination source and increasing the gap size, the shadows projected from the adjacent patches began to move into the measurement area of interest. At a gap of approximately 0.080 inches, the shadows of the adjacent patches began to enter the measurement area, resulting in a jump in error, while at a gap of approximately 0.170 inches; the projected shadows from the adjacent patches actually begin to move away from the measurement area, resulting in a decrease in error.

Accordingly, the present system and method may be used to minimize and/or otherwise control the distance between a transitive substrate, such as the substrate, and a background target 300 may be used to achieve the desired color measurements without having to rely solely on mathematical correction. In one embodiment, the method comprises providing background target 300 and maintaining the transitive substrate within a distance of no more than about 0.290 inches of the backing material. The transitive substrate may be positioned so as to be not in continuous contact with the backing material, although there may be some non-continuous contact with the backing material during the course of operation as described above with reference to FIG. 19.

In alternative embodiments, the transitive substrate can be maintained with in specific desired distances of the background target 300. For example, the transitive substrate can be maintained within a distance of greater than about 0.00 inches and no more than about 0.290 inches, or the transitive substrate can be maintained within a distance of no more than about 0.250 inches, or the transitive substrate can be maintained within a distance of greater than about 0.00 inches and no more than about 0.250 inches, or the transitive substrate can be maintained within a distance of no more than about 0.1 inches, or the transitive substrate can be maintained within a distance of greater than about 0.00 inches and no more than about 0.1 inches, or the transitive substrate can be maintained within a distance of no more than about 0.08 inches, or the transitive substrate can be maintained within a distance of greater than about 0.00 inches and no more than about 0.08 inches, or the transitive substrate can be maintained within a distance of no more than about 0.05 inches, or the transitive substrate can be maintained within a distance of greater than about 0.00 inches and no more than about 0.05 inches.

As described elsewhere, the substrate can be maintained in position through a mechanical force, such as by the use of rollers, idlers, tension bars, guide rails, and other such devices. Alternatively, the substrate can be maintained in position by vacuum or other fluid forces, such as positive airflow. For example, according to an alternative embodiment, the substrate may be held in position using a positive air flow directed downwardly onto the substrate. Alternatively, the substrate may be maintained in the desired positions through a combination of mechanical and fluid forces.

In addition to reducing the potential for optical refraction, the present system and method also reduces the potential formation of shadows on the background target 300. If the transitive substrate is elevated above the background target during the scanning process, a shadow of the printed image may be produced below the substrate thereby altering the background color obtained by the color sensing camera, and simultaneously altering the accuracy of the data received by the color sensing camera assembly 36. Accordingly, by reducing the distance between the transitive substrate and the background target 300, via substrate stabilization, apparatus 100 reduced the ability of shadows to form under the substrate. Therefore, in stabilizing the portion of the substrate containing an image through contact with the background target 300, the apparatus 100 significantly increased the ability of the color sensing camera assembly 36 to obtain an accurate image.

While forming contact between the transitive substrate and background target 300 increases the ability of the color sensing camera to obtain an accurate image, the period of contact is limited to that period required for the color sensing camera to obtain the accurate image data. Due to the abrasive nature of the transitive substrate and the potential for ink transfer to the background target, apparatus 100 limits the contact time. In one embodiment, the formation of substrate stabilization, i.e. drawing a portion of the substrate into the vacuum apertures 254,255 via the formation of vacuum pressure requires between approximately thirty and forty milliseconds. Once the substrate is stabilized, the portion of the transitive substrate containing the printed image contacts the background target 300 for approximately ten milliseconds, during which the camera is activated and obtains an image.

In an alternative embodiment, the substrate stabilization occurs without the transitive substrate forming contact with the background target 300. In such an embodiment the transitive substrate is held at a maximum elevation above the background target 300, based on the substrate and coloring being tested as described above, as to minimize the potential of shadowing and optical refraction from detracting from the accuracy of the image obtained by the color sensing camera.

According to an exemplary embodiment, the dimensions of subassemblies 200, vacuum apertures 254, 255 and background target 300 may be configured to be significantly less that the width of the transitive substrate. Accordingly, when activated, subassembly 200 will only apply vacuum pressure to a portion of the substrate, reducing the amount of tension and reducing the introduction of substrate flutter based on the activation.

The invention has been described in terms of several preferred embodiments. It will be appreciated that the invention may otherwise be embodied without departing from the fair scope of the invention defined by the following claims.

We claim:

1. A method for measuring a transitive substrate, the method comprising:
positioning a background target mounted in a first surface of a substrate stabilizer at a non-imaging distance below a continuous transitive substrate,
wherein the background target is positioned below a portion of the transitive substrate that is less than the whole of the transitive substrate;
further wherein the non-imaging distance is greater than 0.290 inches;
actuating the substrate stabilizer to reposition the portion of the transitive substrate to an imaging distance and maintain the transitive substrate within a distance of no more than about 0.290 inches of the background target, wherein the transitive substrate is not in continuous contact with the background target; and
imaging the transitive substrate with an image recording device while the substrate stabilizer is actuated.

2. The method of claim 1, wherein the transitive substrate is maintained within a distance of greater than about 0.00 inches and no more than about 0.290 inches.

3. The method of claim 1, wherein the transitive substrate is maintained within a distance of no more than about 0.250 inches.

4. The method of claim 3, wherein the transitive substrate is maintained within a distance of greater than about 0.00 inches and no more than about 0.250 inches.

5. The method of claim 1, wherein the transitive substrate is maintained within a distance of no more than about 0.1 inches.

6. The method of claim 5, wherein the transitive substrate is maintained within a distance of greater than about 0.00 inches and no more than about 0.1 inches.

7. The method of claim 1, wherein the transitive substrate is maintained within a distance of no more than about 0.08 inches.

8. The method of claim 7, wherein the transitive substrate is maintained within a distance of greater than about 0.00 inches and no more than about 0.08 inches.

9. The method of claim 1, wherein the transitive substrate is maintained within a distance of no more than about 0.05 inches.

10. The method of claim 9, wherein the transitive substrate is maintained within a distance of greater than about 0.00 inches and no more than about 0.05 inches.

11. The method of claim 1, wherein the background target is configured to provide a consistent color measurement reference.

12. The method of claim 1, wherein imaging the transitive substrate comprises measuring a colorimetric value or densitometric value from the transitive substrate.

13. The method of claim 12, wherein the colorimetric or densitometric value is measured from a portion of the substrate.

14. The method of claim 1, wherein the substrate is maintained in position through a mechanical force.

15. The method of claim 1, wherein the substrate is maintained in position by a fluid force.

16. The method of claim 15, wherein the substrate is maintained in position by a vacuum.

17. The method of claim 1, wherein the substrate is maintained in position through a combination of mechanical and fluid forces.

* * * * *